United States Patent [19]

Schwaiger et al.

[11] Patent Number: 5,015,731
[45] Date of Patent: May 14, 1991

[54] COPPER COMPLEX FORMAZAN COMPOUNDS CONTAINING A CYANAMIDO-S-TRIAZINYLAMINO RADICAL AND A FIBER-REACTIVE GROUP OF THE VINYLSULFONE SERIES, SUITABLE AS DYES

[75] Inventors: Günther Schwaiger, Frankfurt am Main; Hartmut Springer, Königstein/Taunus, both of Fed. Rep. of Germany

[73] Assignee: Hoechst Aktiengesellschaft, Frankfurt am Main, Fed. Rep. of Germany

[21] Appl. No.: 474,531

[22] Filed: Feb. 2, 1990

[30] Foreign Application Priority Data

Feb. 6, 1989 [DE] Fed. Rep. of Germany ....... 3903455

[51] Int. Cl.$^5$ .................. C09B 50/00; C09B 62/503; D06P 1/384; D06P 3/66
[52] U.S. Cl. .................. 534/618; 534/598; 534/652; 534/737; 534/887
[58] Field of Search ............... 534/618, 652

[56] References Cited

U.S. PATENT DOCUMENTS 3,758,470 9/1973 Ackermann et al. ............... 534/618
4,935,500 6/1990 Omura et al. ...................... 534/618

FOREIGN PATENT DOCUMENTS 0280139 8/1988 European Pat. Off. ........... 534/618
62-192467 8/1987 Japan ................................. 534/618
63-05065 7/1988 Japan ................................. 534/618

OTHER PUBLICATIONS

Patent Abstracts of Japan, C. Field, vol. 12, No. 47 (C-475) (2894) (3/12/88).

*Primary Examiner*—Floyd D. Higel
*Assistant Examiner*—Fiona T. Powers

[57] ABSTRACT

Copper complex formazan compounds which have fiber-reactive properties and are very highly suitable for use as dyes for dyeing carboxamido-containing and/or hydroxy-containing material, such as fiber material, for example wool and cellulose fiber materials, have the general formula (1)

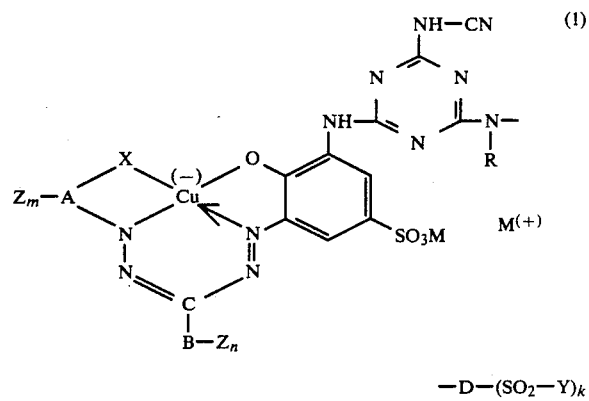

where
A is a benzene or naphthylene ring which may be substituted by substituents customary in dyes, such as halogen, nitro, alkyl and alkoxy,
B is alkylene of 1 to 8 carbon atoms or alkenylene of 2 to 8 carbon atoms which may each be substituted by phenyl which in turn may contain the substituents customary in dyes, or is alkylene-phenylene or alkenylene-phenylene having lower alkylene and alkenylene radicals, while the phenylene radicals may in turn contain the substituents customary in dyes, or is a phenylene or naphthylene radical which may contain substituents customary in dyes, or is the bivalent radical of a heterocycle, such as furan, thiophene or benzimidazole, or
—B—Z together is hydrogen,
Z is a water-solubilizing group, such as sulfo,
k is 1 or 2,
m is 0, 1 or 2,
n is 0, 1 or 2, the sum (m+n) is 1 to 4;
X is oxygen or carbonyloxy,
R is hydrogen or substituted or unsubstituted lower alkyl,
D is substituted or unsubstituted phenylene or naphthylene,
Y is vinyl or an ethyl group which contains in the β-position a substituent which is eliminatable under alkaline conditions, and
M is hydrogen, an alkali metal or an alkaline earth metal.

10 Claims, No Drawings

COPPER COMPLEX FORMAZAN COMPOUNDS CONTAINING A CYANAMIDO-S-TRIAZINYLAMINO RADICAL AND A FIBER-REACTIVE GROUP OF THE VINYLSULFONE SERIES, SUITABLE AS DYES

The present invention relates to fiber-reactive dyes.

Japanese Patent Application Publication Sho-62-192467 and PCT Patent Application Publication No. WO 88/05065 disclose copper complex formazan compounds which have fiber-reactive dye properties and which contain a 1,3,5-triazin-2-ylamino radical whose 4- and 6-positions are substituted by amino groupings. Furthermore, U.S. Pat. No. 3,758,470 describes copper complex formazan compounds with dye properties which contain a 4-chloro-1,3,5-triazin-2-ylamino radical whose 6-position is substituted by the cyanamide group.

The present invention now provides novel copper complex formazan compounds which conform to the general formula (1)

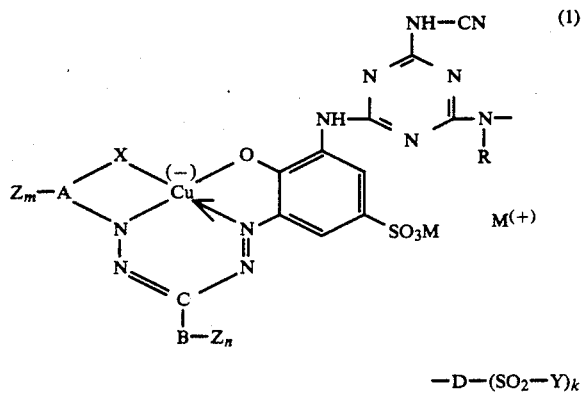

where

A is a benzene or naphthalene ring, preferably a benzene ring, which may each be substituted by substituents selected from the group consisting of halogen, such as chlorine and bromine, nitro, alkyl of 1 to 5 carbon atoms, such as methyl and ethyl, alkoxy of 1 to 4 carbon atoms, such as methoxy and ethoxy, alkylsulfonyl of 1 to 4 carbon atoms such as methylsulfonyl and ethylsulfonyl, phenylsulfonyl, sulfamoyl and N-monoalkyl- and N,N-dialkylsulfamoyl each of 1 to 4 carbon atoms in the alkyl;

B is a straight-chain or branched-chain alkylene group of 1 to 8 carbon atoms, preferably of 1 to 4 carbon atoms, or a straight-chain or branched-chain alkenylene group of 2 to 8 carbon atoms, preferably of 2 to 4 carbon atoms, which may each be substituted by a phenyl radical which in turn may be substituted by substituents selected from the group consisting of methyl, ethyl, methoxy, ethoxy, fluorine, bromine, chlorine and sulfamoyl, or is alkylene phenylene having 1 to 4 carbon atoms in the alkylene moiety or alkenylene phenylene having 2 to 4 carbon atoms in the alkenylene moiety, in each of which the phenylene may be substituted by substituents selected from the group consisting of methyl, ethyl, methoxy, ethoxy, fluorine, chlorine, bromine and sulfamoyl, or is phenylene or naphthylene, preferably phenylene, which may each be substituted by substituents from the group consisting of hydroxy, nitro, halogen, such as chlorine or bromine, alkyl of 1 to 5 carbon atoms, such as methyl and ethyl, alkoxy of 1 to 4 carbon atoms, such as methoxy and ethoxy, and carbalkoxy having 1 to 4 carbon atoms in the alkyl moiety, such as carbomethoxy and carbethoxy, or is the bivalent radical of furan, thiophene, pyrrole, imidazole, indole, pyrazole, pyridine, pyrimidine, quinoline or benzimidazole, or —B—Z is together hydrogen;

Z is a water-solubilizing group, such as carboxy or preferably sulfo, attached as additional substituent on A and B to an aromatic or aliphatic carbon atom of A and B or to an aliphatic carbon atom of a substitutent, such as methyl, on A;

k is 1 or 2, preferably 1;

m is zero, 1 or 2 (if zero, Z being hydrogen);

n is zero, 1 or 2 (if zero, Z being hydrogen);

the sum (m+n) is from 1 to 4, preferably 1 or 2, in particular 1;

if Z is present two or three times in the molecule, it may have different meanings within the stated meanings;

X is oxygen or carbonyloxy —CO—O—, the group X and the N-atom being bonded ortho to each other to the aromatic nucleus of A;

R is hydrogen or substituted or unsubstituted alkyl of 1 to 4 carbon atoms;

D is phenylene which may be substituted, naphthylene which may be substituted, alkylene of 1 to 8 carbon atoms, preferably 2 to 6 carbon atoms, in particular 2 to 4 C-atoms, or is alkylene of 2 to 8 carbon atoms, preferably 3 to 6 carbon atoms, which is interrupted by 1 or more, preferably 1 or 2, hetero groups, such as groups of the formulae —NH—, —N(R¹)—, where R¹ is as defined hereinafter, —O—, —S—, —SO₂—, —CO—, —SO₂—NH—, —NH—SO₂—, —CO—NH— or —NH—CO—, and/or is substituted by 1 or 2 substituents from the group consisting of hydroxy, sulfo, carboxy, sulfato, phosphato and alkanoyloxy of 2 to 5 carbon atoms, or is a radical of the general formula (2a), (2b), (2c), (2d), (2e), (2f), (2g) or (2h)

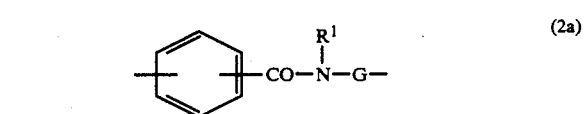

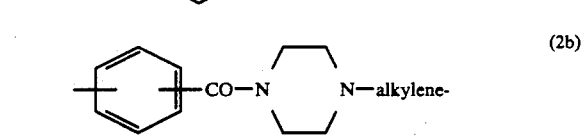

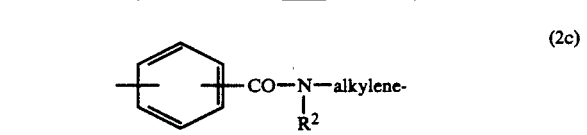

-arylene-alkylene-  (2d)

-alkylene-arylene-  (2e)

-arylene-alkylene-arylene-  (2f)

-alkylene-arylene-alkylene-  (2g)

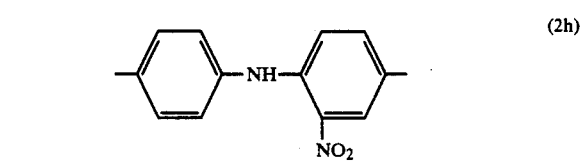

in which

R¹ is hydrogen or alkyl of 1 to 4 carbon atoms, such as methyl or ethyl,

R² is hydrogen, alkyl of 1 to 4 carbon atoms, such as methyl or ethyl, which may be substituted by a group of the general formula —$SO_2$—Y, where Y is as defined hereinafter, or by carboxy, sulfato, methoxy, ethoxy or chlorine, or isphenyl which may be substituted by 1 or 2 substituents from the group consisting of methyl, methoxy, ethoxy, sulfo, carboxy and chlorine, G is phenyl which may be substituted by 1 or 2 substituents from the group consisting of chlorine, alkyl of 1 to 4 carbon atoms, such as methyl, alkoxy of 1 to 4 carbon atoms, such as methoxy or ethoxy, hydroxy, sulfo and carboxy, arylene is phenylene which may be substituted by 1 or 2 substituents from the group consisting of chlorine, bromine, nitro, alkoxy of 1 to 4 carbon atoms, such as methoxy or ethoxy alkyl of 1 to 4 carbon atoms such as methyl or ethyl, carboxy and sulfo, or is naphthylene which may be substituted by 1 or 2 sulfo groups, alkylene is alkylene of 1 to 8 carbon atoms, preferably 1 to 3 carbon atoms, or alkylene of 2 to 8 carbon atoms, preferably 3 to 6 carbon atoms, which is interrupted by 1 or more, preferably 1 or 2, hetero groups, such as groups of the formulae —NH—, —N(R¹)—, where R¹ is as defined hereinafter, —O—, —S—, —$SO_2$—, —CO—, —$SO_2$—NH—, —NH—$SO_2$—, —CO—NH— or —NH—CO—, and/or is substituted by 1 or 2 substituents from the group consisting of hydroxy, sulfo, carboxy, sulfato, phosphato and alkanoyloxy of 2 to 5 carbon atoms, and the alkylene and arylene moieties in the radicals of the general formulae (2d) to (2g) may in each case be separated from each other by one of the above-mentioned hetero groups;

Y is vinyl or an ethyl group which is substituted in the β-position by a substituent which can be eliminated under alkaline conditions; and M is hydrogen, an alkali metal, such as sodium, potassium or lithium, or one equivalent of an alkaline earth metal, such as one equivalent of calcium, or preferably is hydrogen or an alkali metal.

Substituents in substituted alkyl R of 1 to 4 carbon atoms are for example hydroxy, carboxy, sulfato, phosphato, sulfo, cyano, alkoxy of 1 to 4 carbon atoms, alkoxyalkoxy containing alkyl and alkylene radicals each of 1 to 4 carbon atoms, and a group of the general formula —$SO_2$—Y where Y is as defined above.

Substituents in phenylene D are for example hydroxy, nitro, chlorine, bromine, fluorine, alkoxy of 1 to 4 carbon atoms such as methoxy or ethoxy, alkyl of 1 to 4 carbon atoms such as methyl or ethyl, sulfo, carboxy, β-sulfatoethylthio, alkylamino and dialkylamino each of 1 to 4 carbon atoms in the alkyl moiety or moieties, either or both of the alkyl groups, which are preferably ethyl groups, being unsubstituted or substituted by hydroxy, sulfo, carboxy, sulfato, phosphato, alkoxy of 1 to 4 carbon atoms, such as ethoxy, alkoxyalkoxy having 1 to 4 carbon atoms each, preferably 2 carbon atoms each, in the alkyl or alkylene radical, hydroxyalkoxy of 1 to 4, preferably 2, carbon atoms in the alkylene radical, sulfatoalkoxy of 1 to 4, preferably 2, carbon atoms in the alkylene radical and succinylamido of the formula —NH—CO—$CH_2$—$CH_2$—COOM, where M is as defined above; preferably, phenylene D is unsubstituted or substituted by methyl, methoxy, sulfo or a group of a general formula (2A) defined hereinafter.

Of the alkylamino and dialkylamino groups mentioned, the preferred ones are those which conform to the general formula (2A)

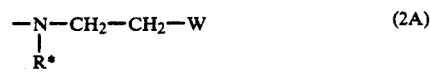
(2A)

in which

R* is hydrogen, methyl or ethyl and

W is sulfo, sulfato, β-sulfatoethoxy or succinylamido.

Naphthylene D is preferably bonded to the group —N(R)— in the 2-position and may be substituted by sulfo.

Preferably, B is phenyl which may be substituted by Z and/or chlorine, methyl, methoxy or carboxy.

Examples of β-substituents on ethyl which can be eliminated by means of alkali to leave a vinyl group in radical Y are halogen, such as chlorine or bromine, alkanoyloxy of 2 to 5 carbon atoms, such as acetyloxy, aroyloxy, such as benzoyloxy or sulfobenzoyloxy, arylsulfonyloxy, such as p-methylphenylsulfonyloxy, lower dialkylamino, such as dimethylamino or diethylamino, phosphato, thiosulfato and sulfato. Preferably, Y is vinyl or β-chloroethyl, or in particular β-sulfatoethyl.

The substituents "sulfo", "carboxy", "phosphato", "thiosulfato" and "sulfato" include not only their acid form but also their salt form. Accordingly, the sulfo groups are groups conforming to the general formula —$SO_3M$, carboxy groups are groups conforming to the general formula —COOM, phosphato groups are groups conforming to the general formula —$OPO_3M_2$, thiosulfato groups are groups conforming to the general formula —S—$SO_3M$, and sulfato groups are groups conforming to the general formula —$OSO_3M$, in each of which M is as defined above.

The compounds of the general formula (1) according to the present invention can be present in the acid form and in the form of their salts, in particular the above-mentioned alkali and alkaline earth metal salts. They find use, preferably in the form of the alkali metal salts, for dyeing (including printing) hydroxy- and/or carboxamido-containing materials, in particular fiber materials.

Of the copper complex formazan compounds according to the present invention, the particularly notable ones are those which conform to the general formulae (1a) and (1b):

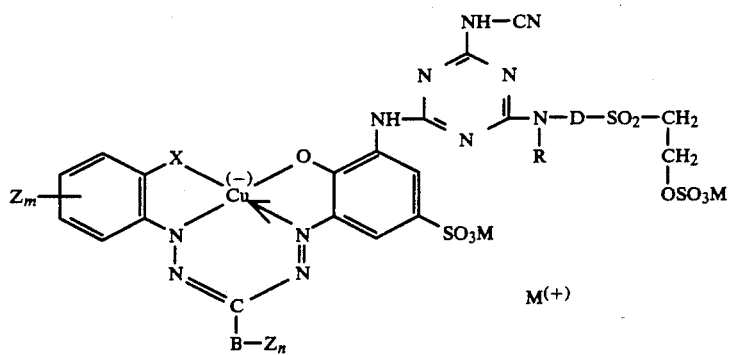

(1a)

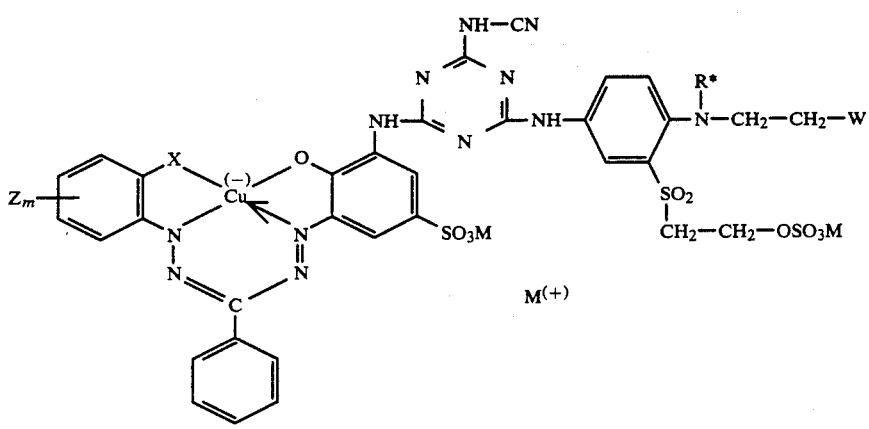

(1b)

where
X is oxygen or preferably carbonyloxy,

B is a benzene ring which may be substituted by chlorine, methyl, methoxy or ethoxy, but preferably is not substituted by any of these substituents, Z is sulfo, m is 1 or 2, preferably 1, N is zero or 1, preferably zero, the sum (m+n) is 1 or 2, R is hydrogen or alkyl of 1 to 4 carbon atoms, such as methyl, D is meta- or para-phenylene, preferably metaphenylene, R* is hydrogen or methyl, W is sulfato, sulfo, β-sulfatoethoxy or succinylamido, and M is hydrogen or an alkali metal.

Of these, the preferred ones are in particular those which conform to the general formula (1c)

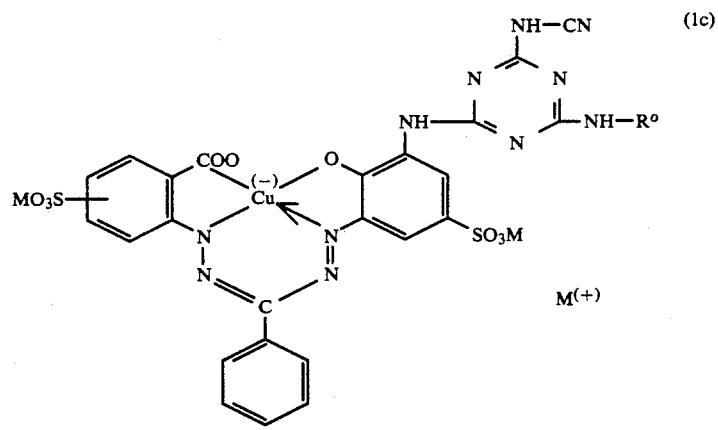

(1c)

where

M is hydrogen or preferably an alkali metal,

R° is 4-(β-sulfatoethylsulfonyl)phenyl, 2-chloro-5-(β-sulfatoethylsulfonyl)phenyl, 2-methoxy-5-(β-sulfatoethylsulfonyl)phenyl, 4-chloro-3-(β-sulfatoethylsulfonyl)phenyl, 4-methoxy-3-(β-sulfatoethylsulfonyl)phenyl or particularly preferably 3-(β-sulfatoethylsulfonyl)phenyl, and the sulfo group —SO₃M is preferably para to the carbonyloxy group.

The present invention further relates to processes for preparing the copper complex formazan compounds of the general formula (1), which comprise, if D is substituted or unsubstituted phenylene or naphthylene or a radical of the general formula (2a), (2b), (2c), (2d), (2f)

or (2h), reacting a dihalotriazinylamino copper formazan compound of the general formula (3)

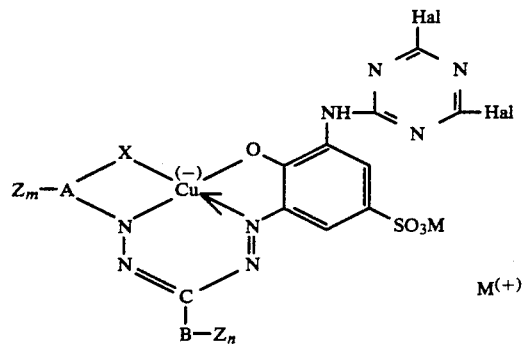

where Z, m, n, A, B, X and M are each as defined above and Hal is halogen, such as fluorine or preferably chlorine, with cyanamide or an alkali metal salt thereof, such as sodium cyanamide, and with an aromatic amino compound of the general formula (4)

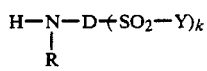

where R, k and Y are each as defined above and D is as just defined, or reacting a compound of the general formula (5)

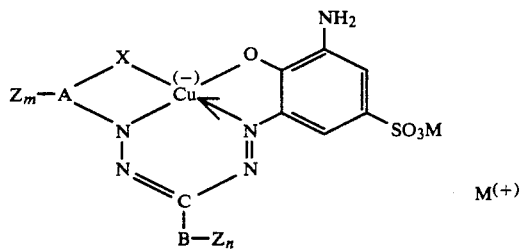

where Z, m, n, A, B, X and M are each as defined above, with a dihalotriazinylamino compound of the general formula (6)

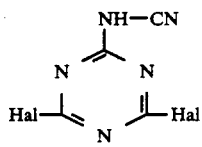

where Hal is as defined above, and reacting the resulting copper formazan compound of the general formula (7)

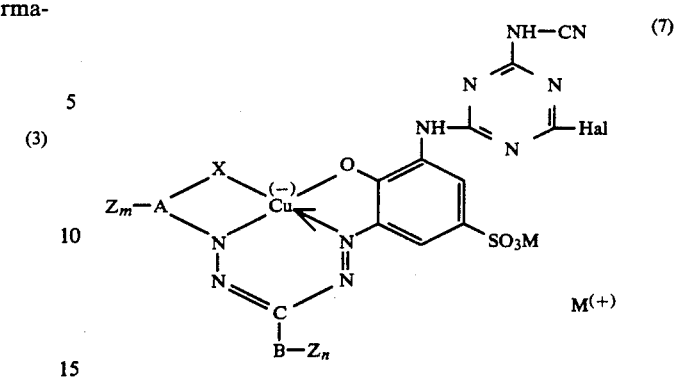

where Z, m, n, A, B, X, M and Hal are each as defined above, with an amino compound of the general formula (4), where D is as just defined, or, if D is as defined for the formula (1), reacting a compound of the general formula (5) with a compound of the general formula (6A)

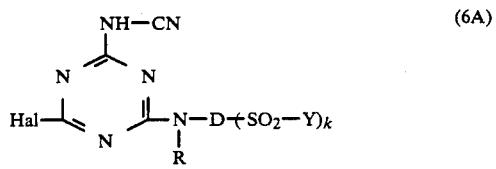

where Hal, R, D, Y and k are each as defined for the formula (1).

The amino copper formazan starting compounds of the general formula (5) and the dihalotriazinyl derivatives thereof of the general formula (3) are known, for example from European Patent Applic. Publication No. 0 280 139 A and the references cited therein on page 10, and can be prepared by the directions given therein.

The reactions according to the present invention are carried out in general in an aqueous medium at a pH between 2 and 12, preferably between 3 and 10, and at a reaction temperature between 0° C. and 80° C. Preferably, the reaction of the compounds of the general formula (3) according to the present invention is carried out first with cyanamide, preferably in the form of its sodium salt, as the reactant of lower reactivity and then the resulting compound (7) is reacted with the amine (4).

The condensation reaction of the dihalotriazinylamino copper formazan of the general formula (3) with cyanamide or an alkali metal salt thereof can be carried out as described in U.S. Pat. No. 3,758,470, for example in the case of Hal=chlorine at a pH of 7 to 12, in particular 9 to 11, and at a temperature between 0° and 60° C., preferably between 40° and 50° C. The second condensation reaction, namely that of the monohalocyanamidotriazinylamino copper formazan of the general formula (7) with the amine of formula (4), is preferably carried out at a pH of 2 to 5, in particular 3 to 4, and at a temperature between 40° and 80° C., preferably between 60° and 70° C.

The reaction of the trihalo-s-triazine with cyanamide or an alkali metal salt thereof can likewise be carried out as described in U.S. Pat. No. 3,758,470; for example in the case of cyanuric chloride at a pH of 9 to 10 and at a temperature between −5° C. and +10° C. The condensation reaction between the dihalocyanamido-s-triazine of the general formula (6) and the amino compound of the general formula (4) can be carried out at a temperature between 10° and 80° C., preferably between 20° and 60° C., and at a pH between 2 and 8, preferably between 4 and 5, in the case of D equals alkylene or a radical of the formula (2e) or (2g) preferably at a pH between 6 and 8. The reaction between the compound of the general formula (6A) and the compound of the general formula (5) is carried out at a temperature between 40° and 80° C., preferably between 50° and 60° C., and at a pH between 2 and 6, preferably between 3 and 5.

Starting compounds which are preferably used for preparing the starting copper formazan compounds of the general formula (5) are:

Arylamines which contain the aryl component A and which are first converted into aryl hydrazines and then, with an aldehyde component, into the corresponding aryl hydrazone, for example 2-aminophenol, 4-methyl-2-aminophenol, 5-methyl-2-aminophenol, 4-sulfo-2-amino-phenol, 5-sulfo-2-aminophenol, 4-sulfo-6-carboxy-2-aminophenol, 4-methoxy-2-aminophenol, 5-methylsulfonyl-2-aminophenol, 4-(N-methylsulfamoyl)-2-aminophenol, 4-(N,N-dimethylsulfamoyl)-2-aminophenol, 5-nitro-2-aminophenol, 4-bromo-2-aminophenol, 4,6-disulfo-2-aminophenol, 6-nitro-4-sulfo-2-aminophenol, 4-nitro-6-sulfo-2-aminophenol, 4-acetylamino-6-sulfo-2-aminophenol, 4-chloro-6-sulfo-2-aminophenol, 6-chloro-4-sulfo-2-aminophenol, 4-methylsulfonyl-2-aminophenol, 4-butylsulfonyl-2-aminophenol, 4-ethylsulfonyl-2-aminophenol, 4-sulfamoyl-2-aminophenol, 1-amino-2-hydroxynaphthalene-4,6-disulfonic acid, 1-amino-2-hydroxy-6-nitronaphthalene-4-sulfonic acid, 1-amino-2-hydroxy-6-chloronaphthalene-4-sulfonic acid, 4-methyl-6-sulfo-2-aminophenol, 2-amino-benzoic acid, 4-sulfo-2-aminobenzoic acid, 5-sulfo-2-aminobenzoic acid, 5-nitro-2-aminobenzoic acid, 4-chloro-2-aminobenzoic acid, 5-chloro-2-aminobenzoic acid, 4-methoxy-2-aminobenzoic acid and 2,5-dicarboxyaniline, preferably 4-sulfo-2-aminophenol, 5-sulfo-2-aminophenol, 5-sulfo-2-aminobenzoic acid and in particular 4-sulfo-2-aminobenzoic acid.

Aldehyde components conforming to the general formula $Z_n$—B—CHO are for example benzaldehyde, 2-methylbenzaldehyde, 3-methylbenzaldehyde, 4-methylbenzaldehyde, 3-sulfo-4-methyulbenzaldehyde, 2-methoxybenzaldehyde, 3-methoxybenzaldehyde, 4-methoxybenzaldehyde, 4-methoxy-3-chlorobenzaldehyde, 2-nitrobenzaldehyde, 3-nitrobenzadlehyde, 2-hydroxygenzaldehyde, 2chlorobenzaldehyde, 4-chlorobenzaldehyde, 2,4-dichlorobenazaldehyde, 5-sulfo-2-chlorobenzaldehyde, 2-sulfobenzaldehyde, 3-sulfobenzaldehyde, 4-sulfobenzaldehyde, 2,4-disulfobenzaldehyde, 2-acetylaminobenzaldehyde, 4-acetylaminobenzaldehyde, 3-aminobenzaldehyde, 2-sulfo-4-nitrobenzaldehyde, 2-nitro-3-methylbenzaldehyde, 6-nitro-3-methylbenzaldehyde, 2-chloro-6-nitrobenzaldehyde, 1-naphthaldehyde, 2-naphthaldehyde, furan-2-aldehyde, thiophene-2-aldehyde, pyrrole-2-aldehyde, imidazole-2-aldehyde, pyrazole-5-aldehyde, pyridine-2-aldehyde, pyridine-3-aldehyde, pyridine-4-aldehyde, pyrimidine-5-aldehyde, quinoline-4-aldehyde, benzimidazole-2-aldehyde, acetaldehyde, propionaldehyde, n-butyraldehyde, oenanthaldehyde, acrylaldehyde, crotonaldehyde, phenacetaldehyde and cinnamaldehyde, preferably benzaldehyde.

Starting amines conforming to the general formula (4) are likewise known in large numbers from the literature, in particular the Patent literature, inter alia from European Patent Application Publication No. 0 280 139 and previously cited Japanese Patent Application Publication Sho-62-192 467. Such amino compounds are in particular those which conform to the general formulae (4a) and (4b)

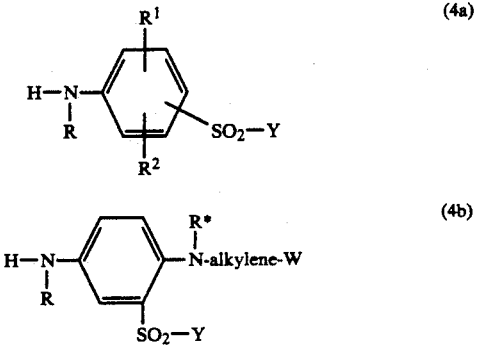

where

R in the formula (4a) is as defined above, preferably hydrogen, and in the formula (4b) is hydrogen or an alkyl of 1 to 4 carbon atoms such as ethyl and in particular methyl, $R^1$ is hydrogen, chlorine, bromine, nitro, alkyl of 1 to 4 carbon atoms, such as ethyl or in particular methyl, alkoxy of 1 to 4 carbon atoms, such as ethoxy or methoxy, carboxy or sulfo, $R^2$ is hydrogen, chlorine, alkyl of 1 to 4 carbon atoms, such as ethyl or in particular methyl, alkoxy of 1 to 4 carbon atoms, such as ethoxy or methoxy, or sulfo, $R^*$ is hydrogen or an alkyl of 1 to 4 carbon atoms, such as ethyl or methyl, alkylene is an alkylene of 2 to 4 carbon atoms, preferably ethylene, and W is sulfo, sulfato, β-sulfatoethoxy or succinylamido.

Amino compounds conforming to the general formula (4) are for example 2-(β-sulfatoethylsulfonyl)aniline, 3-(β-sulfatoethylsulfonyl)aniline, 4-(β-sulfatoethylsulfonyl)aniline, 4-(β-thiosulfatoethylsulfonyl)aniline, 4-(β-phosphatoethylsulfonyl)aniline, 3-(β-thiosulfatoethylsulfonyl)aniline, 3-(β-phosphatoethylsulfonyl)aniline, 4-(β-chloroethylsulfonyl)aniline, 4-vinylsulfonylaniline, 3-vinylsulfonylaniline, 4-methyl-3-(β-sulfatoethylsulfonyl)aniline, 2,5-dimethoxy-4-(β-sulfatoethylsulfonyl)aniline, 2-methoxy-4-(β-sulfatoethylsulfonyl)aniline, 2-chloro-4-(β-sulfatoethylsulfonyl)aniline, 2-methoxy-5-(β-sulfatoethylsulfonyl)aniline, 8-(β-sulfatoethylsulfonyl)-2-aminonaphthalene, 8-(β-sulfatoethylsulfonyl)-6-sulfo-2-aminonaphthalene, 2,5-dimethoxy-4vinylsulfonylaniline, 2-methoxy-5-methyl-4-(β-sulfatoethylsulfonyl)aniline, 4-(β-sulfatoethylsulfonyl)-2aminonaphthalene, 5-(β-sulfatoethylsulfonyl)-2-aminonaphthalene, 6-(β-sulfatoethylsulfonyl)-2-aminonaphthalene, 7-(β-sulfatoethylsulfonyl)-2-aminonaphthalene, 2-bromo-4-(β-sulfatoethylsulfonyl)aniline, 6-(β-sulfatoethylsulfonyl)-8-sulfo-2-aminonaphthalene, 8-(β-phosphatoethylsulfonyl)6-sulfo-2-aminonaphthalene, 6-sulfo-8-vinylsulfonyl-2-aminonaphthalene, 2-methoxy-5-methyl-4-(β-chloroethylsulfonyl)aniline, 2-nitro-4-(β-sulfatoethylsulfonyl)aniline, 2-sulfo-4-(β-sulfatoethylsulfonyl)aniline, 2-sulfo-5-(β-sulfatoethylsulfonyl)aniline, 2-methoxy-5-chloro-4-(β-sulfatoethylsulfonyl)aniline, 2-methoxy-5-chloro-4-vinylsulfonylaniline, 2-ethoxy-5-chloro-4-(β-sulfatoethylsulfonyl)aniline, 6-(β-sulfatoethylsulfonyl)-1-sulfo-2-aminonaphthalene, 5-chloro-2-(β-sulfatoethylsulfonyl)aniline, 5-sulfo-2-(β-sulfatoethylsulfonyl)aniline, 5-chloro-2-(β-thiosulfatoethylsulfonyl)aniline, 5-sulfo-2-(β-thiosulfatoethylsulfonyl)aniline, 2-(β-phosphatoethylsulfonyl)aniline, 5-chloro-2-(β-phosphatoethylsulfonyl)aniline, 5-sulfo-2-(β-phosphatoethylsulfonyl)aniline, 5-chloro-2-vinylsulfonylaniline, 5-sulfo-2-vinylsulfonylaniline, 2-(β-chloroethylsulfonyl)aniline, 5-chloro-2-(β-chloroethylsulfonyl)aniline, 5-sulfo-2-(β-chloroethylsulfonyl)aniline, 6,8-di-(β-sulfatoethylsulfonyl)-2-aminonaphthalene, 2,6-dichloro-4-(β-sulfatoethylsulfonyl)aniline, 2,4-disulfo-5-vinylsulfonylaniline, 2-hydroxy-5-(β-sulfatoethylsulfonyl)aniline, 2-hydroxy-4-(β-sulfatoethylsulfonyl)aniline, 3-sulfo-2-hydroxy-5-(β-sulfatoethylsulfonyl)aniline, 2-carboxy-5-(β-sulfatoethylsulfonyl)aniline, 2-chloro-5-(β-sulfatoethylsulfonyl)aniline, 4-chloro-3-(β-sulfatoethylsulfonyl)aniline, 4-sulfo-3-(β-sulfatoethylsulfonyl)aniline, 3,4-di-(β-sulfatoethylsulfonyl)aniline, 2,5-di-(β-sulfatoethylsulfonyl)aniline, 2,4-di-(β-sulfatoethylsulfonyl)aniline, 3-(β-sulfatoethylsulfonyl)-4-N-(β-sulfatoethyl)aminoaniline, 3-(β-thiosulfatoethylsulfonyl)-4-N-(β-thiosulfatoethyl)aminoaniline, 3-(β-phosphatoethylsulfonyl)-4 -N-(β-phosphatoethyl)aminoaniline, 3-(β-sulfatoethylsulfonyl)-4-N-(γ-sulfato-n-propyl)aminoaniline, 3-(β-sulfatoethylsulfonyl)-N-(ω-sulfato-n-hexyl)aminoaniline, 3-(β-sulfatoethylsulfonyl)-4-(β-sulfatoethyl)thioaniline, 3-(β-sulfatoethylsulfonyl)-N-(β-sulfatoethyl)aminoaniline, 3-(β-sulfatoethylsulfonyl)-4-[N-methyl-N-(β-sulfoethyl)]aminoaniline, 3-(β-sulfatoethylsulfonyl)-4-[N-methyl-N-(βsulfatoethyl)]aminoaniline, 3-(β-sulfatoethylsulfonyl)-4-[β-(β'-sulfatoethoxy)ethyl]aminoaniline, 3-(β-sulfatoethylsulfonyl)-4-N-(α,β-disulfato-n-propyl)aminoaniline, 3-(β-sulfatoethylsulfonyl)-4-N-(carboxymethyl)aminoaniline, 3-(β-sulfatoethylsulfonyl)-4-N-(β-carboxyethyl)aminoaniline, 3-(β-sulfatoethylsulfonyl)-4-N-[β-(β'-sulfatoethylamino)-ethyl]aminoaniline, 3-(β-sulfatoethylsulfonyl)-4-N-{β-[N'-methyl-N'-(β'-sulfatoethyl)amino]ethyl}aminoaniline, 3-(β-sulfatoethylsulfonyl)-4-N-[β-(β'-carboxypropionylamido)ethyl]aminoaniline, 3-(β-sulfatoethylsulfonyl)-4-N-[β-(sulfoacetamido)ethyl]aminoaniline and 3-(β-sulfatoethylsulfonyl)-4-N-[β-(4'-sulfophenyl)ethyl]aminoaniline, furthermore 4-[N-(3'-β-sulfatoethylsulfonylphenyl)carbamoyl]aniline, 3-[N-(4'-β-sulfatoethylsulfonylphenyl)carbamoyl]aniline, 3-[N-(3'-β-sulfatoethylsulfonylphenyl)carbamoyl]aniline, N-ethyl-4-[N'-(3'-vinylsulfonylphenyl)carbamoyl]aniline, N-methyl-4-[N'-(3'-β-sulfatoethylsulfonylphenyl)carbamoyl]aniline, 4-[N-ethyl-N-(4'-β-sulfatoethylsulfonylphenyl)carbamoyl]aniline, 4-[N-(6'-sulfo-8'-βsulfatoethylsulfonylnaphth-2'-yl)-carbamoyl]aniline, 3-[(β-sulfatoethylsulfonyl)methyl]-aniline, 4-sulfo-3-[(β-sulfatoethylsulfonyl)methyl]-aniline, 4-[(β-sulfatoethylsulfonyl)methyl]aniline, 3-[β-(β'-chloroethylsulfonyl)ethyl]carbamoylaniline, 3-[β-(β'-chloroethylsulfonyl)ethyl]carbamoyl-6-chloroaniline, 3-[β-(β'-chloroethylsulfonyl)ethyl]carbamoyl-6-methylaniline, 3-[β-(β'-chloroethylsulfonyl)ethyl]carbamoyl-6-methoxyaniline, 3-{β-[β'-(β''-chloroethylsulfonyl)ethoxyl]-ethyl}carbamoylaniline, 3-[γ-(β'-chloroethylsulfonyl)propyl]carbamoylaniline, 3-bis[β-(β'-chloroethylsulfonyl)ethyl]carbamoylaniline, 3-bis[γ-(β'-chloroethylsulfonyl)propyl]carbamoylaniline, N-ethyl-3-[N'-β-(β'-chloroethylsulfonyl)ethyl]carbamoylaniline, N-isopropyl-3-[N'-β-(β'-chloroethylsulfonyl)ethyl]carbamoylaniline, N-isopropyl-3-[N'-γ-(β'-chloroethylsulfonyl)propyl]carbamoylaniline, 4-[β-(β'-chloroethylsulfonyl)ethyl]carbamoylaniline, 4-{β-[β'-(β''-chloroethylsulfonyl)ethoxy]ethyl}carbamoylaniline, 4-[γ-(β'-chloroethylsulfonyl)propyl]carbamoylaniline, 4-bis[β-(β'-chloroethylsulfonyl)ethyl]carbamoylaniline, 4-bis[γ-(β'-chloroethylsulfonyl)propyl]carbamoylaniline, N-ethyl-4-[β-(β'-chloroethylsulfonyl)ethyl]carbamoylaniline, N-isopropyl-4-[γ-(β'-chloroethylsulfonyl)propyl]carbamoylaniline, 4-[β-(vinylsulfonyl)ethyl]carbamoylaniline, 4-bis[β-(vinylsulfonyl)ethyl]carbamoylaniline, 4-[δ-(β'-chloroethylsulfonyl)butyl]carbamoylaniline, 2-chloro-5-bis[β-(β'-chloroethylsulfonyl)ethyl]carbamoylaniline, 2-methyl-5-bis[β-(β'-chloroethylsulfonyl)ethyl]carbamoylaniline, 2-methoxy-5-bis[γ-(β'-chloroethylsulfonyl)propyl]carbamoylaniline, 3-[δ-(β'-chloroethylsulfonyl)butyl]carbamoylaniline, 3-{β-[β'-(β''-chloroethylsulfonyl)ethoxy]ethyl}carbamoylaniline, 2-hydroxy-5-[β-(β'-chloroethylsulfonyl)ethyl]carbamoylaniline and 2-methoxy-5-bis[β-(β'-chloroethylsulfonyl)ethyl]carbamoylaniline, 2-sulfo-5-[β-(β'-chloroethylsulfonyl)ethyl]carbamoylaniline and 2-sulfo-5-[β-(β'-sulfatoethylsulfonyl)ethyl]carbamoylaniline and also the corresponding sulfato derivatives of these last-mentioned compounds, in which the β-chloroethylsulfonyl group has been replaced by a β-sulfatoethylsulfonyl group, furthermore the vinylsulfonyl derivatives of these last-mentioned compounds, in which the β-chloroethylsulfonyl group has been replaced by a vinylsulfonyl group, and also 1-(3-amino-4-methoxybenzoyl)-N'-(γ-vinylsulfonyl)propyl)piperazine, 2-methoxy-5-[N,N-bis-(β-vinylsulfonylethyl)carbamoyl]aniline, 1-N-(3'-amino-4'-methylbenzoyl)-4-N'-(β-vinylsulfonyl)-ethylpiperazine, 2-sulfo-5-bis[β-(β'-sulfatoethylsulfonyl)ethyl]carbamoylaniline, 2-methoxy-5-bis[β-(vinylsulfonyl)ethyl]carbamoylaniline, 2-methoxy-5-[β-(vinylsulfonyl)ethyl]carbamoylaniline, 1-N-(4'-amino-3'-sulfobenzoyl)-4N'-γ-(vinylsulfonyl)-propylpiperazine, 2-sulfo5-[β-(β'-vinylsulfonylethyl)aminoethyl]carbamoylaniline, 2-methyl-5-[β-(β'-sulfatoethylsulfonyl)ethyl]carbamoylaniline, 2-sulfo-4-bis[β-(β'-chloroethylsulfonyl)ethyl]-carbamoylaniline, 1-N-(4'-amino-3'-sulfobenzoyl)-4N'-β-(vinylsulfonyl)ethylpiperazine, 2-sulfo-4-{[β-(β'-vinylsulfonylethyl)amino]ethyl}carbamoylaniline, 3,5-bis[(β-vinylsulfonylethyl)carbamoyl]aniline and 2-sulfo-4-[β-(β'-vinylsulfonylethoxy)ethyl]carbamoylaniline, particularly preferably 3-[β-(β'-sulfatoethylsulfonyl)-ethyl]carbamoylaniline, 4-[β-(β'-sulfatoethylsulfonyl)-ethyl]carbamoylaniline, 3-[γ-(β'-sulfatoethylsulfonyl)propyl]carbamoylaniline and 4-(γ-(β'-sulfatoethylsulfonyl)propyl]carbamoylaniline, further β-[4-(β'-sulfatoethylsulfonyl)phenyl]ethylamine, β-[2-sulfo-4-(β'sulfatoethylsulfonyl)phenyl]ethylamine, β-(β'-chloroethylsulfonyl)ethylamine, β-(β'-sulfatoethylsulfonyl)ethylamine, β-(vinylsulfonyl)ethylamine, γ-(β'-chloroethylsulfonyl)propylamine, γ-(β'-sulfatoethylsulfonyl)propylamine, γ-(β'-bromoethylsulfonyl)propylamine, γ-(vinylsulfonyl)propylamine, 1-methyl-1-(β-sulfatoethylsulfonyl)-1-ethylamine, δ-(β'-sulfatoethylsulfonyl)butylamine, 2-methyl-2-(β-chloroethylsulfonyl)1propylamine, ω-(β'-chloroethylsulfonyl)pentylamine, β-(β'-chloroethylsulfonyl)-n-hexylamine, N-methyl-N-[β-(β'-chloroethylsulfonyl)ethyl]amine, N-ethyl-N-[β-(β'-chloroethylsulfonyl)ethyl]amine, N-n-propyl-N-[β-(β'-chloroethylsulfonyl)ethyl]amine, N-n-butyl-N-[β-(β'-chloroethylsulfonyl)ethyl]amine, N-carboxymethyl-N-[β-(β'-bromoethylsulfonyl)ethyl]amine, N-sulfatomethyl-N-[β-(β'-chloroethylsulfonyl)ethyl]amine, N-(β-carboxyethyl)-N-[γ'-(β''-chloroethylsulfonyl)propyl]amine, N-(β-sulfatoethyl)-N-[γ'-(β''-chloroethylsulfonyl)propyl]amine, N-(β-sulfatoethyl)-N-[δ'-(β'''-chloroethylsulfonyl)butyl]amine, N-(β-ethoxyethyl)-N-[δ'-(β'''-chloroethylsulfonyl)butyl]amine, N-(γ-chloropropyl)-N-[β'-(β'''-chloroethylsulfonyl)ethyl]-amine, N-phenyl-N-[β-(β'-chloroethylsulfonyl)ethyl]amine, N-(4-chlorophenyl)-N-[β-(β'-chloroethylsulfonyl)ethyl]-amine, N-(2-methylphenyl)-N-[β-(β'-chloroethylsulfonyl)ethyl]amine, N-(4-methoxyphenyl)-N-[β-(β'-chloroethylsulfonyl)ethyl]amine, N-(3-sulfophenyl)-N-[ β-(β'-chloroethylsulfonyl)ethyl]amine, N-(4-sulfophenyl)-N-[β-(β'-chloroethylsulfonyl)ethyl]amine, bis[β-(β'-chloroethylsulfonyl)ethyl]amine, bis[β-(β'-bromoethylsulfonyl)-ethyl]amine, bis[γ-(β'-chloroethylsulfonyl)propyl]amine, bis[δ-(β'-chloroethylsulfonyl)butyl]amine, bis[β-vinylsulfonylethyl)amine, N-(β-cyanoethyl)-N-[γ'-(β''-chloroethylsulfonyl)propyl]amine, β-[β'-(β''-chloroethylsulfonyl)ethylamino]ethylamine, β-[β'-(β''-sulfatoethylsulfonyl)ethylamino]ethylamine, β-[β'-(β''-chloroethylsulfonyl)ethoxy]ethylamine, β-[β'-(β''-sulfatoethylsulfonyl)ethoxy]ethylamine, 4-[β-(β'-chloroethylsulfonyl)ethyl]-piperazine, 4-[γ-(β'-chloroethylsulfonyl)propyl]-piperazine, 4-[β-(β'-sulfatoethylsulfonyl)ethyl]-piperazine, 4-[γ-(β'-sulfatoethylsulfonyl)propyl]-piperazine, 4-{N-[β-(4'-β'-sulfatoethylsulfonylphenyl)-ethyl]amidocarbonylmethoxy}aniline, 4-{N-[3'- or 4'-(β-sulfatoethylsulfonyl)phenyl]amidocarbonylmethoxy}aniline, 4-[γ-(β'-sulfatoethylsulfonyl)propoxy]aniline, 2,5-bis[(β-sulfatoethylsulfonyl)methyl]aniline, 3- or 4-{N-[γ-(β'-sulfatoethylsulfonyl)propylamidocarbonyl]}aniline, 3,5-bis-{N-[γ-(β'-sulfatoethylsulfonyl)propylamidocarbonyl]}aniline, 3-sulfo-4-{[N-γ-(β'-sulfatoethylsulfonyl)propylamidocarb onyl]methoxy}aniline and 4-{[N-γ-(β'-sulfatoethylsulfonyl)propylamidocarbonyl]-methoxy}-aniline.

The copper complex formazan compounds of the general formula (1) prepared according to the present invention are separated from their synthesis batches by generally known methods, namely either by precipitation from the reaction medium by means of an electrolyte salt, for example sodium chloride or potassium chloride, or by evaporating the reaction solution, to which a buffer substance and/or a solubilizer may have been added, for example by spray drying. The novel compounds (1) have fiber-reactive properties and very good dye properties. They can therefore be used for dyeing hydroxy- and/or carboxamido-containing material, in particular in the form of sheetlike structures, such as film and paper, but also leather, or in the mass, such as polyamide and polyurethane, but in particular materials in fiber form. Similarly, the solutions obtained from the synthesis of the compounds according to the invention may be used direct as liquid preparations in dyeing, with or without the prior addition of a buffer substance and/or a solubilizer and with or without concentrating.

The present invention therefore also provides for the use of the compounds of the general formula (1) according to the present invention for dyeing (including mass coloration and printing) these materials, i.e. processes for dyeing such materials in a conventional manner by using a compound of the general formula (1) as colorant. Preferably, the materials find application in the form of fiber materials, in particular in the form of textile fibers.

Hydroxy-containing materials are natural or synthetic hydroxy-containing materials, such as cellulose fiber materials or regenerated products thereof and polyvinyl alcohols. Cellulose fiber materials are preferably cotton but can also be other vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6.6, nylon-6, nylon-11 and nylon-4.

The compounds of the formula (1) according to the present invention can be applied to and fixed on the substrates mentioned, in particular the fiber materials mentioned, by the application techniques known for water-soluble dyes, in particular for fiber-reactive dyes.

Thus, applied to cellulose fibers from a long liquor by the exhaust method using various acid-binding agents with or without neutral salts, for example sodium chloride or sodium sulfate, they give very good color yields. Dyeing takes place at temperatures between 40° and 100° C., or at temperatures of up to 120° C. under superatmospheric pressure, in the presence or absence of customary dyeing assistants, in an aqueous bath. A possible procedure is to introduce the material into the hot bath and then to heat the bath gradually to the desired dyeing temperature and to complete the dyeing process at that temperature.

The neutral salts, which speed up the exhaustion of the dye, may if desired not be added to the bath until after the actual dyeing temperature has been reached.

Padding likewise produces good color yields on cellulose fibers, fixing being effected in a conventional manner by batching at room temperature or at elevated temperature, for example at about 60° C., by steaming or by means of dry heat.

Similarly, the customary printing processes for cellulose fibers, which can be carried out in a single step, for example in the presence of sodium bicarbonate or other acid-binding agents in the print paste containing the compound of the formula (1) and by subsequent steaming of the printed material at 101° to 103° C., or in two steps, for example by printing with a neutral or weakly acid printing paste which contains the compound of the formula (1) and fixing by passing through a hot electrolyte-containing alkaline bath or by overpadding with an alkaline electrolyte-containing padding liquor, subsequent batching of the material so treated or subsequent steaming or subsequent treatment with dry heat, likewise produce strong prints with crisp contours and a clear white ground. Print quality depends very little on varying the fixing conditions. Both in dyeing and printing the compounds according to the present invention give very high degrees of fixation.

Fixing by means of dry heat in a conventional thermofix process is carried out with hot air at 120° to 200° C. Besides customary steam at 101° to 103° C. it is also possible to use superheated steam or high-pressure steam at temperatures above 160° C., when using steam for fixation.

The acid-binding agents which cause the dye to be fixed to cellulose fibers are for example water-soluble basic salts of the alkali or alkaline earth metals of inorganic or organic acids or compounds which liberate alkali on heating, in particular the alkali metal hydroxides and alkali metal salts of weak to medium inorganic or organic acids, the alkali metal compounds in question preferably being the sodium and potassium compounds. Such acid-binding agents are for example sodium hydroxide, potassium hydroxide, sodium carbonate, sodium bicarbonate, potassium carbonate, sodium formate, sodium dihydrophosphate, disodium hydrophosphate, sodium trichloroacetate, sodium silicate and trisodium phosphate.

The treatment of compounds according to the present invention with acid-binding agents with or without heating causes the compounds (dyes) according to the present invention to become chemically bonded to the cellulose fiber; following the usual aftertreatment by rinsing to remove unfixed dye portions the cellulose dyeings have excellent wet fastness properties.

As regards the coloristics of the compounds according to the present invention, it is -particularly noteworthy that they show good stability in print pastes and padding liquors, even in the presence of alkali, that they exhaust very readily from a long liquor, that they show good color buildup on application by the customary dyeing and printing methods, that they dye it to the same depth of shade on both cotton and regenerated cellulose fibers, that the dyeings and prints produced therewith have a level appearance, and that if dyed from a long liquor in the presence of different amounts of electrolytes their dyeings are still uniform.

Dyeing on -polyurethane fibers and polyamide fibers are customarily carried out from an acid medium. For instance, the dye bath may have added to it acetic acid and/or ammonium sulfate and/or acetic acid and ammionium acetate or sodium acetate in order to bring it to the desired pH. To obtain a dyeing of useful levelness, it is advisable to add customary leveling agents, for example based on a reaction product of cyanuric chloride with three times the molar amount of an aminobenzenesulfonic acid and/or an aminonaphthalenesulfonic acid or based on a reaction product of for example stearylamine with ethylene oxide. In general, the material to be dyed is introduced at a temperature of about 40° C. into the initially weakly alkaline bath, and is agitated therein for some time, the dye bath is then brought to a weakly acid pH, preferably by means of acetic acid, and the actual dyeing is carried out at a temperature between 60° and 98° C. However, the dyeings can also be carried out at the boil or at temperatures of up to 120° C. (under superatmospheric pressure).

The dyeings and prints prepared with the compounds according to the present invention are notable for clear, blue shades. In particular the dyeings and prints on cellulose fiber materials are very strong and have good to very good end-use and manufacturing fastness properties, such as good to very good light, perspiration light, wet light and crock fastness and excellent wet fastness properties, such as wash, chlorinated water, chlorine bleach, sea water, fulling, alkali, acid fading, peroxide and perspiration fastness properties, and also a good hot-press and a good drycleaning fastness, and good stability of the complex to iron. Unfixed dye portions are easily washed off the fiber material, an essential prerequisite for the good wet fastness properties of the dyeings. Furthermore, the dyeings are stable to the customary synthetic resin finishes. The compounds (dyes) according to the present invention are in some cases up to the customary anthraquinone standard on the purity of hue and, what is more, have the advantage of very much easier dischargeability compared with said anthraquinone dyes.

The Examples that follow serve to illustrate the invention. Parts and percentages are by weight, unless otherwise stated. Parts by weight bear the same relation to parts by volume as the kilogram to the liter. The compounds written in the form of formulae are shown in the form of free acids; in general, they are prepared and isolated in the form of their alkali metal salts and used for dyeing in the form of their salts. In the same way it is possible to use the starting compounds and components mentioned in the form of free acids in the Examples below in particular the Table Examples, in the synthesis as such or in the form of their salts, preferably alkali metal salts.

The absorption maxima ($\lambda_{max}$) in the visible region reported for the compounds according to the present invention were determined from aqueous solutions of alkali metal salts. In the Table Examples, the $\lambda_{max\ values}$ are given in brackets in nm in the hue column.

EXAMPLE 1

(a) An aqueous, neutral solution of sodium salt of 32.0 parts of hydrazone from 2-carboxy-5-sulfophenylhydrazine and benzaldehyde in about 160 parts of water is stirred together at 5° to 15° C. with a customarily prepared aqueous solution of the diazonium salt of 24.6 parts of 6-acetylamino-4-sulfo-2-aminophenol, 25.0 parts of copper sulfate pentahydrate are then added, and a pH of 5 is maintained by means of sodium carbonate. The reaction batch is then subsequently stirred at 15° to 25° C. until diazonium compound is no longer detectable.

(b) In the copper complex formazan compound synthesized under (a), the acetylamino group is hydrolyzed directly to an amino group in the synthesis solution at a temperature between 90° and 100° C. in the course of 5 to 10 hours on addition of 6 to 10 times the molar amount of concentrated aqueous sodium hydroxide solution (the acetylamino copper formazan compound can also be salted out beforehand from the synthesis solution by means of sodium chloride and isolated and then hydrolyzed in approximately 3% strength aqueous sodium hydroxide solution). The amino-containing copper complex formazan compound obtained can be salted out with sodium chloride after the pH has been adjusted to about 4.

(c) The formazan compound obtained in (b) is reacted with cyanuric chloride. Advantageously this is done by starting from a solution of (b) of pH 4 and reacting the solution with thorough stirring at a temperature of 0° to 5° C. and a pH of between 3 and 4, maintained by means of aqueous sodium carbonate solution, with 16.6 parts of cyanuric chloride to give the 2,4-dichloro-s-triazin-6-ylamino copper complex formazan compound in the course of 3 to 4 hours.

(d) To the synthesis solution (c) is added an aqueous solution of 4.0 parts of cyanamide in about 100 parts of water, and the mixture is heated to 40°-50° C. and maintained at a pH of 9 to 10 by means of an aqueous sodium hydroxide solution until the reaction has ended after about 3 to 4 hours. The synthesis solution obtained is then clarified at 40° to 50° C., and the synthesized monochlorotriazine compound is reacted, either directly in the same solution or after intermediate isolation from the filtrate by addition of sodium chloride or potassium chloride, with 28 parts of 3-($\beta$-sulfatoethylsulfonyl)aniline at a pH of between 3 and 4 and a temperature between 60° and 80° C. in the course of 5 to 10 hours to give the copper complex formazan compound according to the present invention.

After clarification, the compound according to the present invention is isolated from the filtrate by salting out with sodium chloride or potassium chloride or by evaporating to dryness or spray drying. This gives the alkali metal salt (sodium or potassium salt) of the compound of the formula

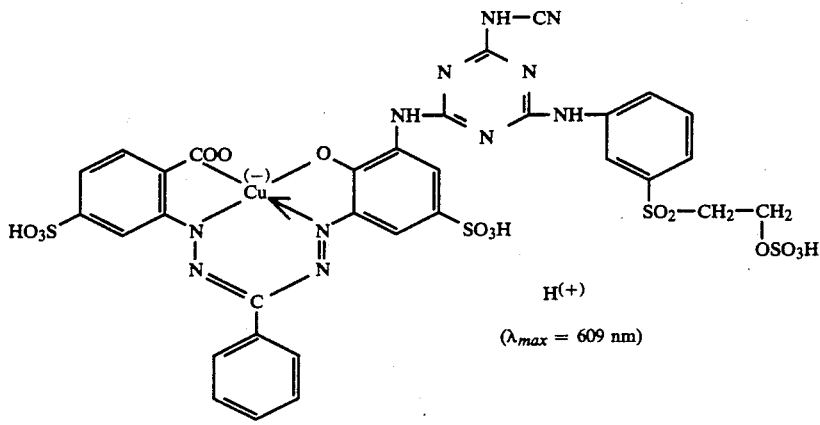

($\lambda_{max}$ = 609 nm)

as an electrolyte-containing dark powder. The compound according to the present invention has very good dye properties and dyes the materials mentioned in the description in blue shades having a slight reddish tinge. In particular cellulose fiber materials, such as cotton and also regenerated cellulose fiber materials, are dyed in deep shades by means of the application and fixing methods customary in the art of fiber-reactive dyes, for example from an aqueous, long liquor at 40° to 80° C. in the presence of an acid-binding agent. Similarly, cold padbatch processes give very high color yields. Following the customary aftertreatment, for example by soaping for 10 minutes and rinsing with water, the dyeings obtained according to the present invention have very good light fastness properties not only in the dry state but also when moistened with tap water or an alkaline or acid perspiration solution, and good wet fastness properties, such as wash, chlorinated water, chlorine bleach, alkali, perspiration and peroxide fastness properties. They also have a good acid fading resistance, and the dyeings are readily dischargeable. Particularly remarkable features are the very high color buildup and the high rates of fixation in exhaust and padding processes.

EXAMPLE 2

(a) 18.4 parts of cyanuric chloride are suspended in the absence or presence of an nonionic assistant in a mixture of 50 parts of water and 50 parts of ice, an aqueous solution of 4.5 parts of cyanamide and 100 parts of water is then added while the temperature is maintained at 0° to 5° C. and the pH is maintained at 8 to 10, and the mixture is stirred for some time until free cyanuric chloride is no longer detectable.

(b) The solution of the monocondensation product obtained by (a) may be clarified and is then admixed with an aqueous solution of the amino copper complex formazan compound prepared as described in Example (1a)–(b) and adjusted to pH 5, and the batch is heated to 30°–40° C. and maintained at that temperature at a pH of 5 to 7 by means of aqueous 10% strength sodium carbonate solution until the condensation reaction of the dichlorotriazinylamino compound with the amino group of the copper complex formazan compound has ended.

The monochlorotriazine compound obtained is identical to that of Example (1d), and can be reacted as described in the previous Example with 3-($\beta$-sulfatoethylsulfonyl)-aniline to give the copper complex formazan compound of Example 1 according to the present invention. The formazan compound thus obtained according to the present invention has similar dye properties.

EXAMPLES 3 TO 60

The Table Examples below describe further copper complex formazan compounds according to the present invention with the aid of the general formula (A)

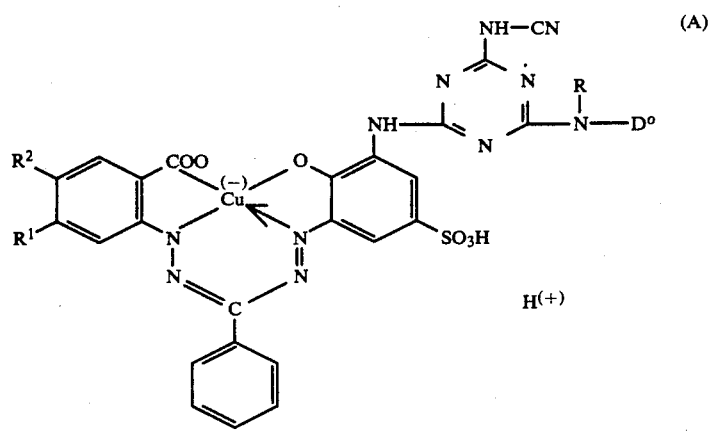

(A)

They can be prepared in a manner according to the present invention, for example as described in Working Examples 1, 2 and 61, with the aid of the components evident from formula (A) and the particular Table Example (cyanuric chloride, 2-carboxy-5- or -4-sulfo-phenylhydrazine, benzaldehyde, the diazonium salt of 6-acetylamino-4-sulfo-2-aminophenol and an aniline compound conforming to the general formula HRN-D°, where D° and R are each as defined in the particular Table Example). They likewise have very good fiber-reactive dye properties and applied by the dyeing and printing methods customary for fiber-reactive dyes produce in particular on cellulose fiber materials strong fast dyeings and prints having the hue on cotton indicated in the particular Table Example.

| | Compounds conforming to the formula (A) | | | | |
|---|---|---|---|---|---|
| Example | $R^1$ | $R^2$ | Radical R | Radical D° | Hue ($\lambda_{max}$) |
| 3 | Sulfo | Hydrogen | Methyl | 3-($\beta$-Sulfatoethylsulfonyl)-phenyl | blue (610) |
| 4 | Sulfo | Hydrogen | Ethyl | 3-($\beta$-Sulfatoethylsulfonyl)-phenyl | blue (610) |
| 5 | Sulfo | Hydrogen | Hydroxy-methyl | 3-($\beta$-Sulfatoethylsulfonyl)-phenyl | blue (610) |
| 6 | Sulfo | Hydrogen | Hydrogen | 4-($\beta$-Sulfatoethylsulfonyl)-phenyl | blue (610) |
| 7 | Sulfo | Hydrogen | Methyl | 4-($\beta$-Sulfatoethylsulfonyl)-phenyl | blue (610) |
| 8 | Sulfo | Hydrogen | Ethyl | 4-($\beta$-Sulfatoethylsulfonyl)-phenyl | blue (610) |
| 9 | Sulfo | Hydrogen | Hydrogen | 2-Methoxy-5-($\beta$-sulfatoethylsulfonyl)phenyl | blue (610) |
| 10 | Sulfo | Hydrogen | Hydrogen | 4-Methoxy-3-($\alpha$-sulfatoethylsulfonyl)phenyl | blue (610) |
| 11 | Sulfo | Hydrogen | Hydrogen | 4-Methyl-3-($\beta$-sulfatoethylsulfonyl)phenyl | blue (610) |
| 12 | Sulfo | Hydrogen | Hydrogen | 4-($\beta$-Sulfatoethylthio)-3-($\beta'$-sulfatoethylsulfonyl)phenyl | blue (610) |
| 13 | Sulfo | Hydrogen | Hydrogen | 4-[N-Methyl-N-($\beta$-sulfatoethyl)]-amino-3-($\beta'$-sulfatoethylsulfonyl)phenyl | blue (610) |
| 14 | Sulfo | Hydrogen | Hydrogen | 1-Sulfo-6-($\beta$-sulfatoethylsulfonyl)naphth-2-yl | blue (610) |
| 15 | Sulfo | Hydrogen | Hydrogen | 2-Methyl-5-methoxy-4-($\beta$-sulfatoethylsulfonyl)phenyl | blue (610) |
| 16 | Sulfo | Hydrogen | $\beta$-Chloro-ethyl | 3-Chloro-5-($\beta$-phosphatoethylsulfonyl)phenyl | blue (610) |
| 17 | Sulfo | Hydrogen | n-Propyl | 4,6-Di-($\beta$-sulfatoethylsulfonyl)-naphth-1-yl | blue (610) |
| 18 | Sulfo | Hydrogen | Hydrogen | 4-($\beta$-Thiosulfatoethylsulfonyl)-phenyl | blue (610) |
| 19 | Sulfo | Hydrogen | $\beta$-Methoxy-ethyl | 3-($\beta$-Sulfatoethylsulfonyl)phenyl | blue (610) |
| 20 | Sulfo | Hydrogen | Hydrogen | 2,5-Dimethoxy-4-($\beta$-sulfatoethylsulfonyl)phenyl | blue (610) |
| 21 | Sulfo | Hydrogen | Hydrogen | 3-Vinylsulfonylphenyl | blue (610) |
| 22 | Sulfo | Hydrogen | Hydrogen | 3-Chloro-5-($\beta$-phosphatoethylsulfonyl)phenyl | blue (610) |
| 23 | Sulfo | Hydrogen | Hydrogen | 2-($\beta$-Sulfatoethylsulfonyl)phenyl | blue (610) |
| 24 | Sulfo | Hydrogen | Hydroxy- | 6-Sulfo-1-($\beta$-chloroethylsulfonyl)naphth-1-yl | blue (610) |
| 25 | Sulfo | Hydrogen | $\beta$-Methoxy-ethyl | 3-($\beta$-Sulfatoethylsulfonyl)-phenyl | blue (610) |
| 26 | Sulfo | Hydrogen | Hydrogen | 4-Vinylsulfonylphenyl | blue (610) |
| 27 | Sulfo | Hydrogen | Hydrogen | 4-($\beta$-Acetyloxyethylsulfonyl)-phenyl | blue (610) |
| 28 | Sulfo | Hydrogen | Hydroxy-methyl | 2-Methoxy-5-($\beta$-sulfatoethylsulfonyl)phenyl | blue (610) |
| 29 | Sulfo | Hydrogen | Hydrogen | 4-($\beta$-Sulfatoethylamino)-3-($\beta'$-sulfatoethylsulfonyl)phenyl | blue (610) |
| 30 | Sulfo | Hydrogen | Hydrogen | 4-($\beta$-Sulfoethylamino)-3-($\beta'$-sulfatoethylsulfonyl)phenyl | blue (610) |
| 31 | Sulfo | Hydrogen | Hydrogen | 4-[N-Methyl-N-($\beta$-sulfoethylsulfonyl)]amino-3-($\beta'$-sulfatoethylsulfonyl)phenyl | blue (610) |
| 32 | Sulfo | Hydrogen | Hydrogen | 4-[$\beta$-(Succinylamido)ethyl]-amino-3-[$\beta'$-sulfatoethylsulfonyl)phenyl | blue (610) |
| 33 | Sulfo | Hydrogen | Hydrogen | 4-[$\beta$-($\beta'$-Sulfatoethoxy)ethyl]-amino-3-($\beta''$-sulfatoethylsulfonyl)phenyl | blue (610) |
| 34 | Sulfo | Hydrogen | Hydrogen | 4-Chloro-3-($\beta'$-sulfatoethylsulfonyl)phenyl | blue (610) |
| 35 | Hydrogen | Sulfo | Hydrogen | 4-($\beta$-Sulfatoethylsulfonyl)- | blue |

-continued

| Compounds conforming to the formula (A) | | | | |
|---|---|---|---|---|
| Example | $R^1$ | $R^2$ | Radical R | Radical D* | Hue ($\lambda_{max}$) |
| | | | | phenyl | (616) |
| 36 | Hydrogen | Sulfo | Hydrogen | 3-($\beta$-Sulfatoethylsulfonyl)-phenyl | blue (616) |
| 37 | Hydrogen | Sulfo | Hydrogen | 2-Methoxy-5-($\beta$-sulfatoethyl-sulfonyl)phenyl | blue (616) |
| 38 | Hydrogen | Sulfo | Hydrogen | 1-Sulfo-6-($\beta$-sulfatoethyl-sulfonyl)naphth-2-yl | blue (616) |
| 39 | Hydrogen | Sulfo | Hydrogen | 4-($\beta$-Sulfatoethylamino)-3-($\beta'$-sulfatoethylsulfonyl)phenyl | blue (616) |
| 40 | Sulfo | Hydrogen | Hydrogen | 3,4-Di-($\beta$-sulfatoethylsulfonyl)-phenyl | blue (610) |
| 41 | Sulfo | Hydrogen | Hydrogen | 2-Carboxy-5-($\beta$-sulfatoethyl-sulfonyl)phenyl | (610) |
| 42 | Sulfo | Hydrogen | Hydrogen | 2-Chloro-5-($\beta$-sulfatoethyl-sulfonyl)phenyl | blue (610) |
| 43 | Sulfo | Hydrogen | Hydrogen | 4-N-(3'-$\beta$-Sulfatoethylsulfonyl-phenyl)carbamoylphenyl | blue (610) |
| 44 | Sulfo | Hydrogen | Hydrogen | 3-N-[$\beta$-($\beta'$-Sulfatoethylsulfonyl)-ethyl]carbamoylphenyl | blue (610) |
| 45 | Sulfo | Hydrogen | Hydrogen | 3-{Bis-N,N-[$\beta$-($\beta'$-sulfato-ethylsulfonyl)ethyl]}carbamoyl-phenyl | blue (610) |
| 46 | Sulfo | Hydrogen | Hydrogen | 3-($\beta$-Sulfatoethylsulfonyl)-methylphenyl | blue (610) |
| 47 | Sulfo | Hydrogen | Hydrogen | 4-[2'-Nitro-4'-($\beta$-sulfatoethyl-sulfonyl)phenylamino]phenyl | greenish blue (612) |
| 48 | Sulfo | Hydrogen | Hydrogen | $\gamma$-($\beta'$-Sulfatoethylsulfonyl)-propyl | blue (608) |
| 49 | Sulfo | Hydrogen | Hydrogen | $\gamma$-($\beta'$-Chloroethylsulfonyl)-propyl | blue (608) |
| 50 | Sulfo | Hydrogen | Hydrogen | $\gamma$-(Vinylsulfonyl)propyl | blue (608) |
| 51 | Sulfo | Hydrogen | Hydrogen | $\beta$-($\beta'$-Sulfatoethylsulfonyl)ethyl | blue (608) |
| 52 | Sulfo | Hydrogen | Hydrogen | $\beta$-($\beta'$-Chloroethylsulfonyl)ethyl | blue (608) |
| 53 | Sulfo | Hydrogen | Hydrogen | $\beta$-(Vinylsulfony)ethyl | blue (608) |
| 54 | Sulfo | Hydrogen | Hydrogen | $\beta$-[$\beta'$-(Vinylsulfonyl)ethoxy]-ethyl | blue (608) |
| 55 | Sulfo | Hydrogen | Hydrogen | $\beta$-[4-($\beta'$-Sulfatoethylsulfonyl)-phenyl]-ethyl | blue (608) |
| 56 | Sulfo | Hydrogen | Hydrogen | 4-($\beta$-Sulfatoethylsulfonyl)-benzyl | blue (608) |
| 57 | Sulfo | Hydrogen | $\beta$-($\beta'$-Chloroethyl-sulfonyl)ethyl | $\beta$-($\beta'$-Chloroethyl-sulfonyl)ethyl | blue (608) |
| 58 | Sulfo | Hydrogen | Methyl | $\beta$-($\beta'$-Chloroethyl-sulfonyl)ethyl | blue (608) |
| 59 | Sulfo | Hydrogen | $\beta$-(Vinylsulfonyl)-ethyl | $\beta$-(Vinylsulfonyl)ethyl | blue (608) |
| 60 | Hydrogen | Sulfo | Hydrogen | $\gamma$-($\beta'$-Sulfatoethyl-sulfonyl)propyl | blue (61) |

EXAMPLE 61

(a) 18.4 parts of cyanuric chloride are suspended in the presence or absence of a nonionic assistant in a mixture of 100 parts of water and 100 parts of ice, 4.5 parts of cyanamide are then added while a temperature of 0° to 5° C. and a pH of 9 to 10 are maintained, and the mixture is subsequently stirred for about an hour until free cyanuric chloride is no longer detectable. The batch is then adjusted to pH 6.

(b) The solution of the monocondensation product obtained by (a), which may be clarified, is admixed with a solution of 28 parts of 3-($\beta$-sulfatoethylsulfonyl)aniline in 200 parts of water, and the batch is heated to a temperature of 40° to 60° C. while a pH of 5 is maintained. An aqueous solution, adjusted to pH 5, of the amino copper complex formazan compound obtained as described in the preceding Example (1a)-(1b) is then added, and the pH is maintained at 3.5 to 5 for 4 hours.

The formazan compound obtained according to the present invention has the same good dye properties as the copper complex formazan compound obtained as per Example (1d).

EXAMPLE 62

The procedure of Example 1 for preparing a copper complex formazan compound according to the present invention is followed, except that the hydrazone used in Example (1a) is replaced by an equivalent amount of hydrazone formed from 2-hydroxy-5-sulfophenylhydrazine and benzaldehyde.

This gives the alkali metal salt (sodium or potassium salt) of the compound of the formula

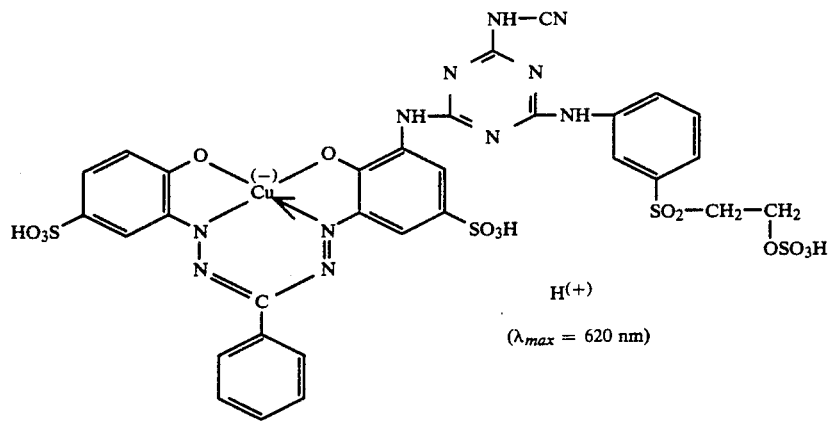

($\lambda_{max}$ = 620 nm)

as an electrolyte-containing dark powder. The compound according to the present invention likewise has very good fiber-reactive dyeing properties and dyes the materials mentioned in the description, in particular cellulose fiber materials, in deep blue shades having good fastness properties.

We claim:

1. A copper complex formazan compound conforming to the formula (1)

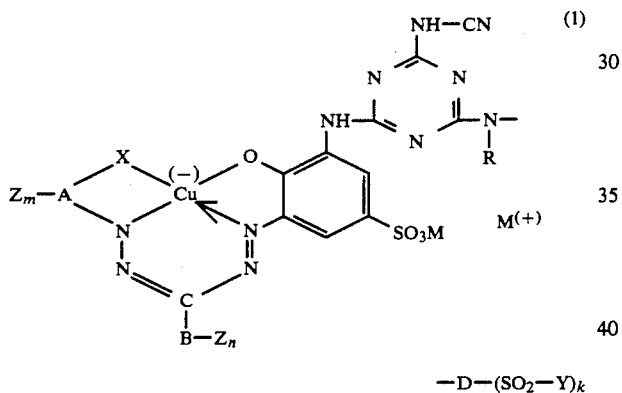

where

A is a benzene or naphthalene ring, which is unsubstituted or substituted by substituents selected from the group consisting of halogen, nitro, alkyl of 1 to 5 carbons, alkoxy of 1 to 4 carbons, alkylsulfonyl of 1 to 4 carbons, phenylsulfonyl, sulfamoyl and N-monoalkyl- and N,N-dialkylsulfamoyl each of 1 to 4 carbons in the alkyl;

B is a straight-chain or branched-chain alkylene of 1 to 8 carbons, or a straight-chain or branched-chain alkenylene of 2 to 8 carbons, which is unsubstituted or substituted by a phenyl which is unsubstituted or substituted by substituents selected from the group consisting of methyl, ethyl, methoxy, ethoxy, fluorine, bromine, chlorine and sulfamoyl, or is alkylene-phenylene having 1 to 4 carbons in the alkyl moiety or alkenylene-phenylene having 2 to 4 carbons in the alkenylene moiety, in each of which the phenylene is unsubstituted or substituted by substituents selected from the group consisting of methyl, ethyl, methoxy, ethoxy, fluorine, chlorine, bromine and sulfamoyl, or is phenylene or naphthylene, each being unsubstituted or substituted by substituents from the group consisting of hydroxy, nitro, halogen, alkyl of 1 to 5 carbons, alkoxy or 1 to 4 carbons and carbalkoxy having 1 to 4 carbons in the alkyl moiety, or is the bivalent radical of furan, thiophene, pyrrole, imidazole, indole, pyrazole, pyridine, pyrimidine, quinoline or benzimidazole, or —B—Z is together hydrogen;

Z is sulfo or carboxy, attached as additional substituent on A and B to an aromatic of aliphatic carbon of A and B or to an aliphatic carbon of a substituent of A;

k is 1 or 2;

m is zero, 1 or 2 (if zero, Z being hydrogen);

n is zero, 1 or 2 (if zero, Z being hydrogen);

the sum (m+n) is from 1 to 4;

if Z if present two or three times in the molecule, it may have different meanings within the stated meanings;

X is oxygen of carbonyloxy of the formula —CO—O—, the group X and the N-atom being bonded ortho to each other to the aromatic nucleus of A;

R is hydrogen or an unsubstituted or substituted alkyl of 1 to 4 carbons wherein the substituents are selected from the group consisting of hydroxy, carboxy, sulfato, phosphato, sulfo, cyano, alkoxy of 1 to 4 carbons, alkoxyalkoxy the alkyl and alkylene moieties of which being each of 1 to 4 carbons, and a group of the formula —SO$_x$—Y, where Y is as defined below;

D is an phenylene, unsubstituted or substituted by substituents selected from the group consisting of hydroxy, nitro, chlorine, bromine, fluorine, alkoxy of 1 to 4 carbons, alkyl of 1 to 4 carbons, sulfo, carboxy, β-sulfatoethylthio, alkylamino and dialkylamino each of 1 to 4 carbons in the alkyl moiety or moieties where either or both of the alkyl groups in said alkylamino and dialkylamino are unsubstituted or substituted by hydroxy, sulfo, carboxy, sulfato, phosphato, alkoxy or 1 to 4 carbons, alkoxyalkoxy having 1 to 4 carbons in the alkyl or alkylene radical, hydroxyalkoxy of 1 to 4 carbons in the alkylene radical, sulfatoalkoxy of 1 to 4 carbons in the alkylene radical and succinylamido of the formula —NH—CO—CH$_2$—CH$_2$—COOM, where M is defined below; an unsubstituted or a sulfo-substituted naphthylene, alkylene of 1 to 8 carbons, alkylene of 2 to 8 carbons interrupted by 1 or more hetero moieties selected from a group consisting of —NH—, —N(R¹)—, —O—, —S—, —SO₂—, —CO—, —SO₂—NH—, —NH—SO₂—, —CO—NH— and —NH—CO—, or substituted by 1 or 2 substituents from the group consisting of hydroxy, sulfo, carboxy, sulfato, phosphato, and alkanoyloxy of 2 to 5 carbons, or alkylene of 2 to 8 carbons substituted by 1 or more said hetero moieties and hydroxy, sulfo, carboxy, sulfato, phosphato, and alkanoyloxy of 2 to 5 carbons, or D is a group of the general formula (2a), (2b), (2c), (2d), (2e), (2f), (2g) or (2h)

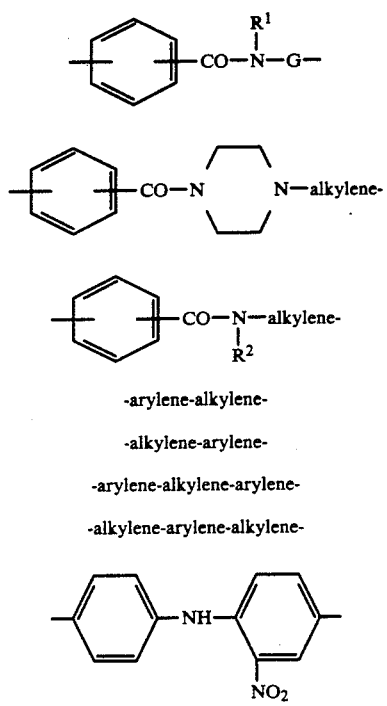

-arylene-alkylene-  (2d)
-alkylene-arylene-  (2e)
-arylene-alkylene-arylene-  (2f)
-alkylene-arylene-alkylene-  (2g)
(2h)

R¹ is hydrogen or alkyl or 1 to 4 carbons,
R² is hydrogen or alkyl of 1 to 4 carbons, which is unsubstituted or substituted by a group of the general formula —SO₂—Y, where Y is as defined hereinafter, or by carboxy, sulfato, methoxy, ethoxy or chlorine, or is phenyl which is unsubstituted or substituted by 1 or 2 substituents from the group consisting of methyl, methoxy, ethoxy, sulfo, carboxy and chlorine,
G is phenyl which is unsubstituted or substituted by 1 or 2 substituents from the group consisting of chlorine, alkyl of 1 to 4 carbons, alkoxy or 1 to 4 carbons, hydroxy, sulfo and carboxy,
arylene is phenylene which is unsubstituted or substituted by 1 or 2 substituents from the group consisting of chlorine, bromine, nitro, alkoxy or 1 to 4 carbons, alkyl or 1 to 4 carbons, carboxy and sulfo, or is naphthylene which is unsubstituted or substituted by 1 or 2 sulfo groups,
alkylene is alkylene of 1 to 8 carbons, or is alkylene of 2 to 8 carbons, which is interrupted by 1 or more said hetero moieties or is substituted by 1 or 2 substituents from the group consisting of hydroxy, sulfo, carboxy, sulfato, phosphato and alkanoyloxy of 2 to 5 carbons, or is alkylene of 2 to 8 carbons substituted by 1 or more said hetero moieties and hydroxy, sulfo, carboxy, sulfato, phosphato, and alkanoxyloxy of 2 to 5 carbons, the alkylene and arylene moieties in the radicals of the general formulae (2d) to (2g) may in each case be separated from each other by one of the said hetero moieties;
Y is vinyl or an ethyl which is substituted in the β-position by a substituent which is eliminated under alkaline conditions; and
M is hydrogen, an alkali metal, or one equivalent of calcium.

2. A compound as claimed in claim 1, wherein A is a benzene ring.

3. A compound as claimed in claim 1, wherein B is phenylene.

4. A compound as claimed in claim 1, wherein Y is vinyl, β-chloroethyl, β-bromoethyl, β-alklanoyloxyethyl having an alkanoyl radical of 2 to 5 carbons, β-benzoyloxyethyl, β-sulfobenzoyloxyethyl, β-(p-methylphenylsulfonyloxy)ethyl, β-dialkylaminoethyl having alkyl radicals of 1 to 4 carbons, β-phosphatoethyl, β-thiosulfatoethyl or β-sulfatoethyl.

5. A compound as claimed in claim 1 conforming to the formula (1a)

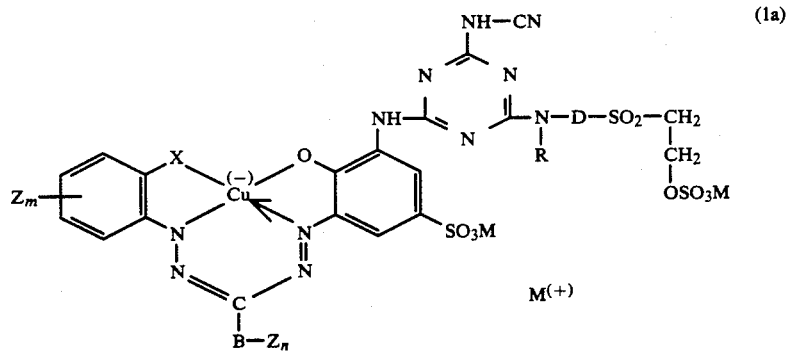

where
X is oxygen or carbonyloxy,
B is a benzene ring which is unsubstituted or substituted by chlorine, methyl, methoxy or ethoxy,
Z is sulfo,
m is 1 or 2,
n is zero or 1,
the sum (m+n) is 1 or 2,
R is hydrogen or alkyl of 1 to 4 carbons
D is meta- or para-phenylene, and
M is hydrogen or an alkali metal.

6. A compound as claimed in claim 1 of formula (1b)

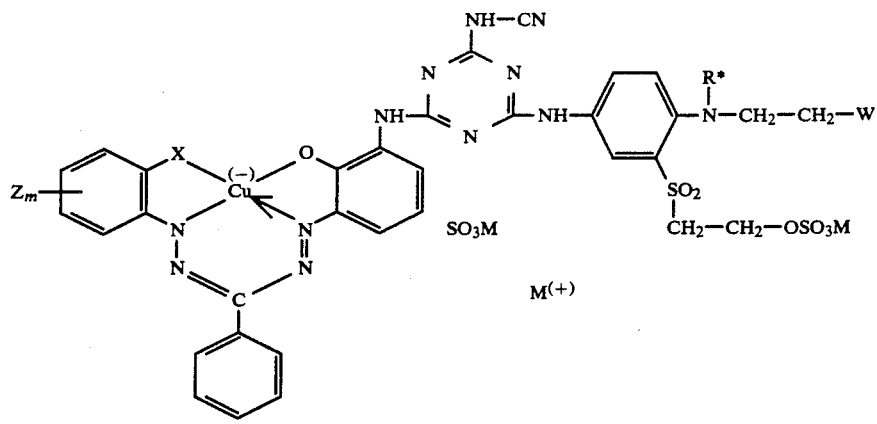

(1b)

where
X is oxygen or carbonyloxy,
Z is sulfo,
m is 1 or 2,
R* is hydrogen or methyl,
W is sulfato, sulfo, β-sulfatoethoxy or succinylamido, and
M is hydrogen or an alkali metal.

7. A compound as claimed in claim 1, wherein X is carbonyloxy.

8. A compound as claimed in claim 1, wherein D is meta-phenylene.

9. A compound as claimed in claim 1 conforming to the formula (1c)

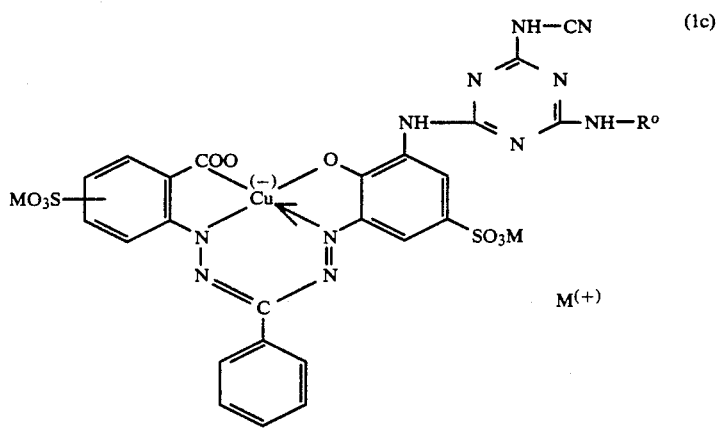

(1c)

where
M is hydrogen or an alkali metal, and
R° is 4-(β-sulfatoethylsulfonyl)phenyl, 2-chloro-5-(β-sulfatoethylsulfonyl)phenyl, 2-methoxy-5-(β-sulfatoethylsulfonyl)phenyl, 4-chloro-3-(β-sulfatoethylsulfonyl)phenyl, 4-methoxy-3-(β-sulfatoethylsulfonyl)phenyl or 3-(β-sulfatoethylsulfonyl)phenyl.

10. A compound as claimed in claim 9, wherein the sulfo group —SO₃M is para to the carbonyloxy group.

* * * * *